June 1, 1971 L. E. GRENTE ET AL 3,581,369

MANUFACTURE OF RELAY CONTACT STACKS

Filed July 9, 1969 6 Sheets-Sheet 1

Inventors
LUCIEN ERNEST GRENTE
GUY ERIENNE, JARDIN
GABRIEL
By James B. Raden
Attorney

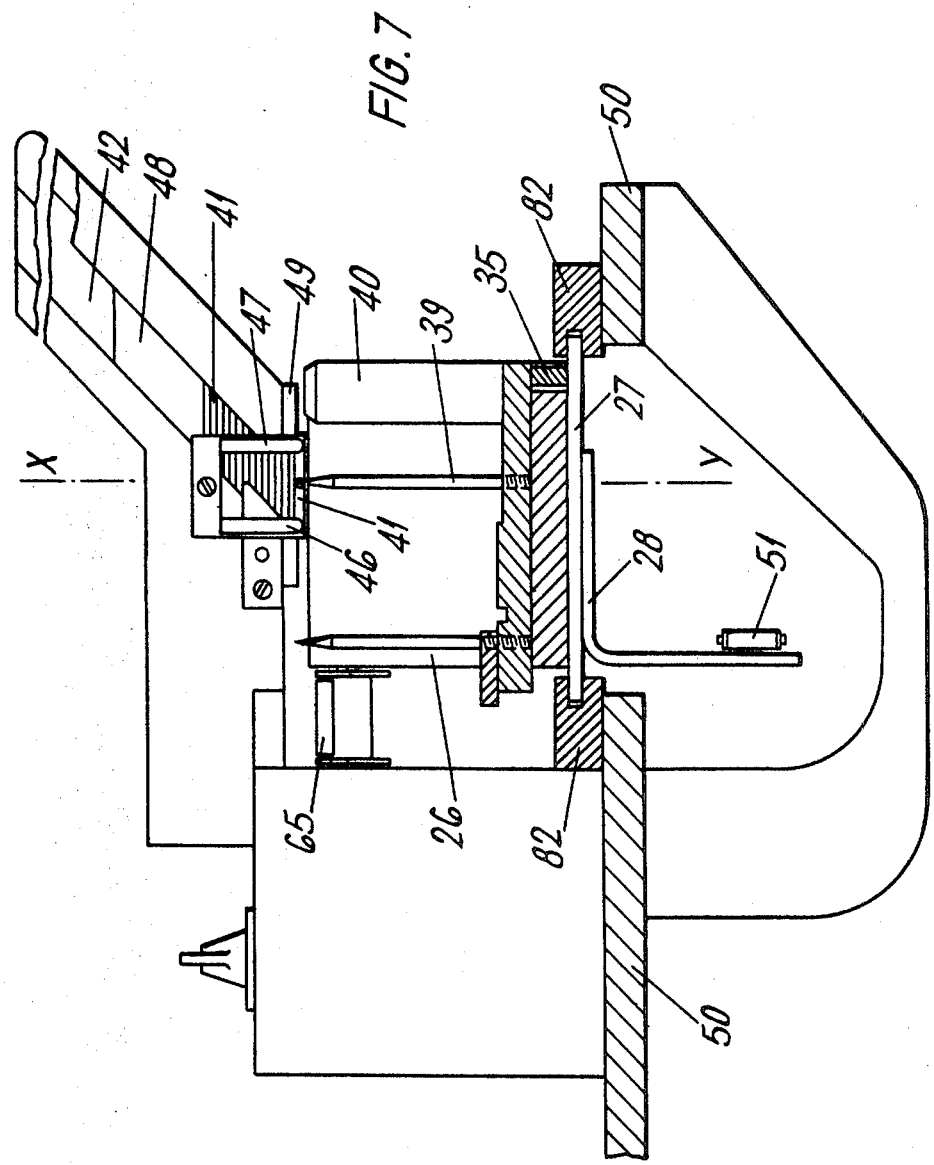

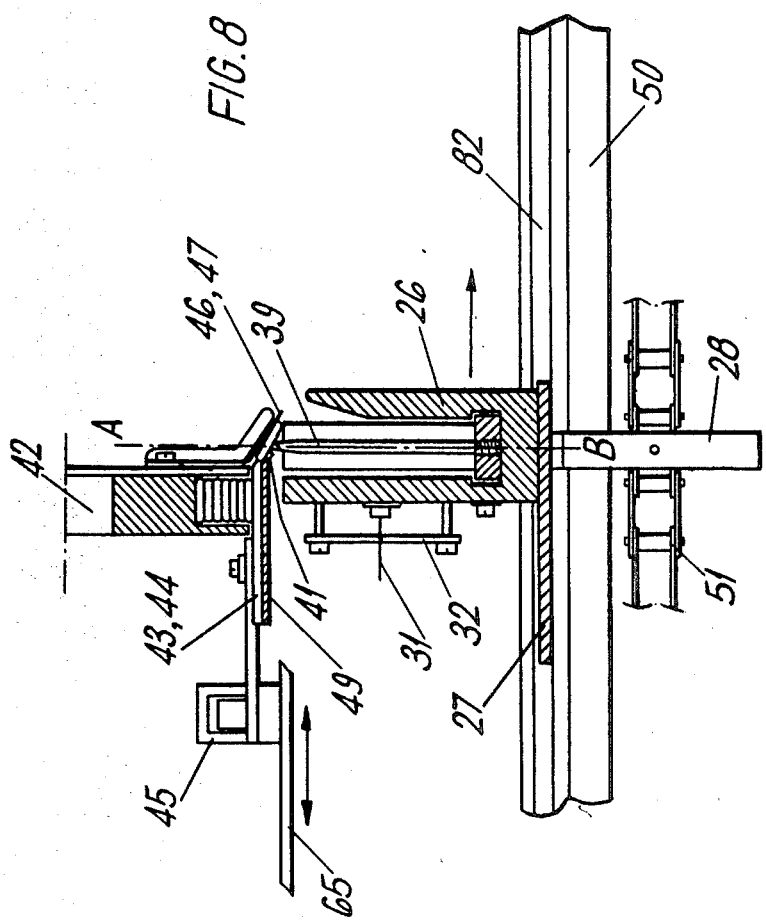

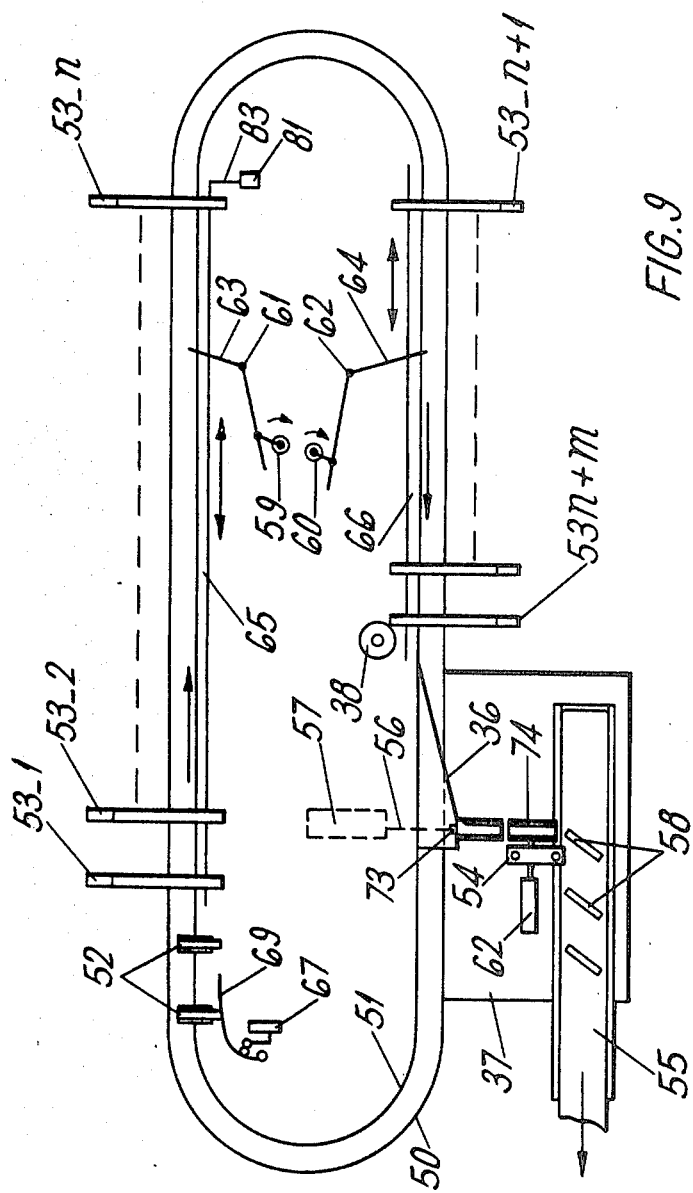

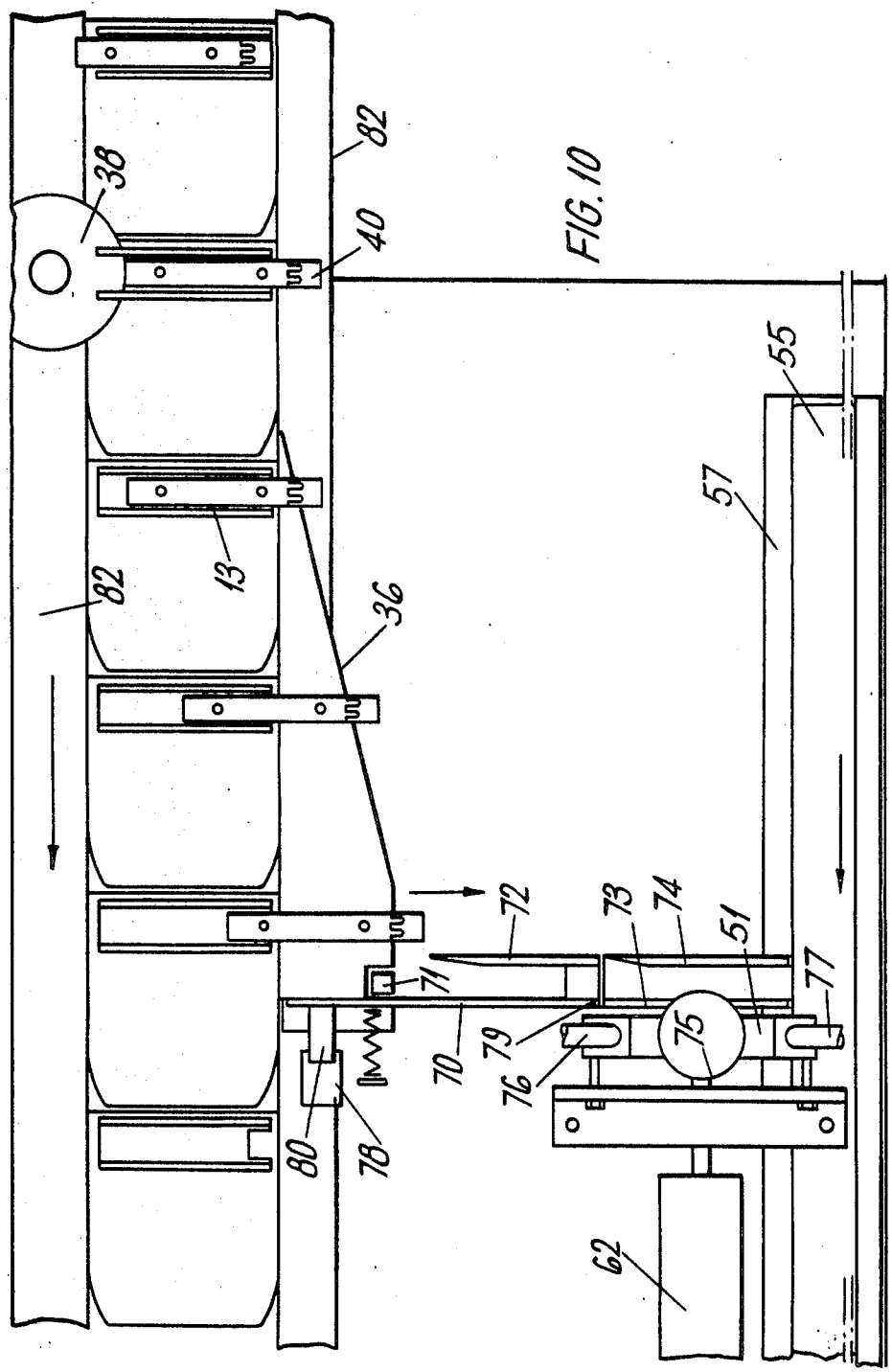

United States Patent Office 3,581,369
Patented June 1, 1971

3,581,369
MANUFACTURE OF RELAY CONTACT STACKS
Lucien Ernest Grente, Boulogne, and Guy Etienne Gabriel Jardin, La Celle Saint-Cloud, France, assignors to International Standard Electric Corporation, New York, N.Y.
Filed July 9, 1969, Ser. No. 840,330
Claims priority, application France, July 19, 1968, 159,857
Int. Cl. H01r 43/00
U.S. Cl. 29—203
7 Claims

ABSTRACT OF THE DISCLOSURE

Contact pile-up carriers are arranged on an endless belt. The pieces to be assembled in a pile-up are positioned in magazines above the belt and at right angles thereto. As the belt moves the carriers, the pieces are automatically deposited on the carriers. Each piece has at least one hole. Each carrier has pins, corresponding to the holes in the pieces, to hook pieces from the magazine and to center them in the stack. Each carrier has a movable base (which bears the pins). At the end of a cycle, this base is withdrawn sideways from the chain, together with the stack of pieces on the pins of the base.

---

The present invention concerns an automatic machine for making the contact stacks of relays used particularly in telephone switching. Until now, these stacks were assembled manually by stacking end plates, contact springs and insulating spacers one on top of another.

An object of the present invention is to provide a machine which performs this assembly automatically.

In accordance with one feature of the present invention, a machine for stacking relay contacts is provided, comprising an endless receptacle transport chain, which moves the said receptacles under dispensers, each of which contains one of the types of the constituent parts of the said stack, with: parts comprising at least one round hole; receptacles having two parallel, vertical sides, spaced by a width practically equal to that of the stack (to within mechanical clearances), pins corresponding to the number of holes in the various parts and means of aligning the parts whose edges are not parallel over their whole length; dispensers, comprising part magazines, pushers and two sets of flat pinch-springs sloped downwards, the said pushers being controlled by the movement of the chain and being adapted as a receptacle passes beneath a dispenser to push the first part in the magazine outlet and to place it between the said two sets of springs, the speed of the pushers being practically equal to the rate of advance of the chain and the slope given to the part by the pinch-springs enabling the pins of the receiver to hook the part by its holes in order to make it drop to the bottom of the receptacle.

According to another feature of the present invention, the top set of springs is longer than the bottom set of springs and continues to press on the part after it has been hooked by the said pins so as to make it fall rapidly to the bottom of the receptacle.

According to another feature of the present invention, the said receptacles have a movable part consisting of a base fixed to the pins and having a notch, and a fixed part forming a support and carrying a retractable ball engaged in the notch when in the loading position.

According to another feature of the present invention, the machine is equipped with an idling wheel and an oblique slide for moving said bases from said supports on the endless chain after they have been through a complete loading cycle.

According to another feature, the machine is equipped with a pneumatic device for placing the two contact stack assembly screws in their holes.

According to another feature, the machine is equipped with compressed-air driven actuators and slides for moving said receptacle bases onto an evacuation area placed at the exit from the endless chain and for making them move successively from the oblique slide to under the assembly screw insertion device and finally for guiding them onto a magnetic belt.

Other features of the present invention will be clear from the following detailed description. It should be understood that the description and drawing are given as examples and in no way limit the scope of the invention.

FIG. 7 shows a receptacle positioned beneath a dispenser delivering an insulating plate, drawn partially cut away through the section A–B in FIG. 8.

FIG. 8 shows the same receptacle under a dispenser seen from the side through the section X–Y indicated in FIG. 7.

FIG. 9 gives a general schematic plan view of the machine.

FIG. 10 gives a detailed plan view of the evacuation area.

Figure 1:
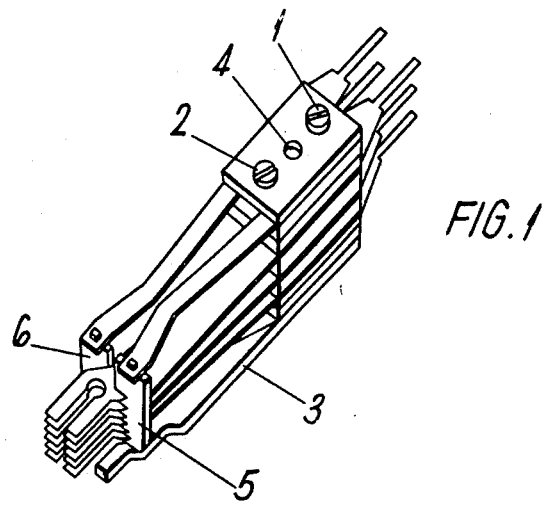
FIG. 1 shows a perspective view of a stack of contacts in the form ready to be mounted on a relay together with a coil and armature to constitute a relay used in telecommunications or remote-control.

FIG. 1 shows a perspective view of a completely assembled contact stack, such as it is when mounted on a relay (not shown). Items 1 and 2 are the spring and spacer assembly clamping screws, which screw into base plate 3. The screw for fixing the contact stack to the relay (not shown) passes through hole 4.

When this contact stack reaches the end of the chain, it does not comprise the fixed rack 5, or the moving rack 6 which are added manually, for example, when tightening the two fixing screws and inspecting.

Figure 2:
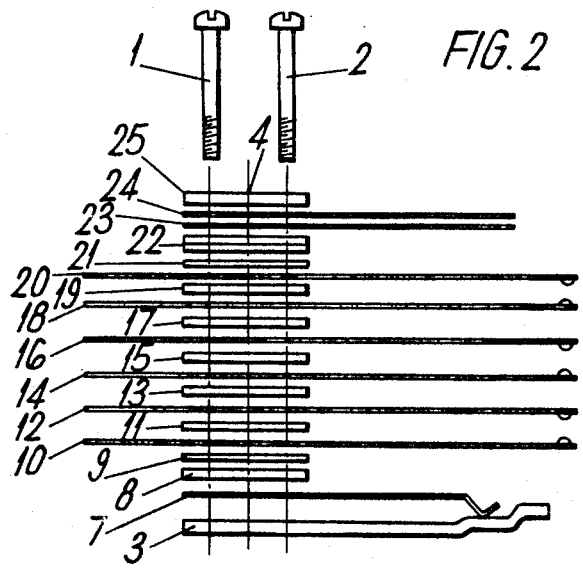
FIG. 2 shows the parts comprising a stack in an exploded side view: contact springs, insulating plates, base plate, end plate and the operating rack retaining springs.

FIG. 2 is an exploded side view of this contact stack, which is taken as an example and comprises one normally closed springset and two normally open springsets. This figure shows from bottom to top:

the stack base plate 3,
the moving rack operating spring 7,
a metal spacer plate 8,
a thin insulating strip 9,
the fixed contact spring 10 of the normally closed springset,
a thin insulating strip 11,
the moving contact spring 12 of the normally closed springset,
a thick insulating spacer 13,
the moving contact spring 14 of the first normally open springset,
a thick insulating spacer 15,
the fixed contact spring 16, of the first normally open springset,
a thick insulating spacer 17,
the moving contact spring 18 of the second normally open springset,
a thick insulating spacer 19,
the fixed contact spring 20 of the second normally open springset,
a thin insulating strip 21,
two thick insulating spacers 22,
the fixed rack guide spring 23,
the moving rack guide spring 24,
a thick metal plate, 25, clamping the assembly.

In accordance with the invention, these various parts are automatically stacked in receptacles. A receptacle comprises a support, FIGS. 3 and 4, and a base, FIGS. 5 and 6. The assembly, consisting of the base mounted on a support, may be seen in FIGS. 7 and 8.

Figure 3:
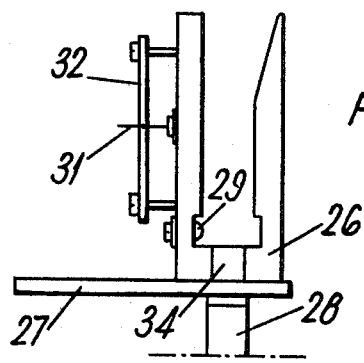
FIG. 3 shows a receptacle support seen from the rear.
Figure 4:
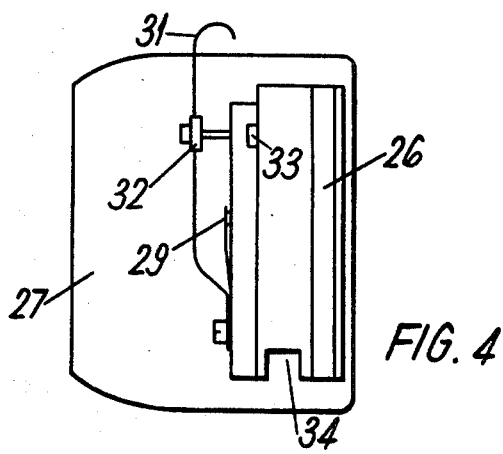
FIG. 4 shows a plan view of the same support.

FIGS. 3 and 4 show elevation and plan views of a receptacle support.

One of the parallel sides 26 of the receptacle is milled obliquely towards the inside to facilitate the descent of the parts over the receptacle pins. The support is mounted on a plate 27 which slides in two grooves in the endless chain milled in two plastic rails 82 (FIG. 7) fixed to the table of the machine for guiding the receptacles in their circuit under the dispensers. The front end of plate 27 is rounded to facilitate its fitting into the curves at the ends of the table.

The right-angled bracket 28 is fixed to plate 27 and to the endless chain for the purpose of pushing the receptacles along. A ball 29 mounted on a spring drops into the notch 30 shown in FIG. 6 to hold the receptacle base in position.

A spring 31, which passes through a bar 32 fixed to another bar 33 fitting into a cut-out in the left upright of the receptacle, aligns the contact springs having only one guide hole in the receptacle. A pillar, not shown, fixed to the table to meet the end of 31, is placed after each dispenser delivering such contact springs. Its purpose is to push the assembly consisting of bars 32, and 33 towards the inside of the support to press the contact spring against side 26.

Figure 5:
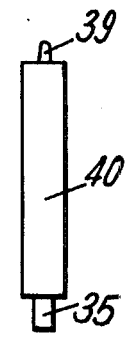
FIG. 5 shows a receptacle base seen from the rear.

A cut-out 34 is let into the guide base to take the base stud 35 (FIG. 5).

Figure 6:
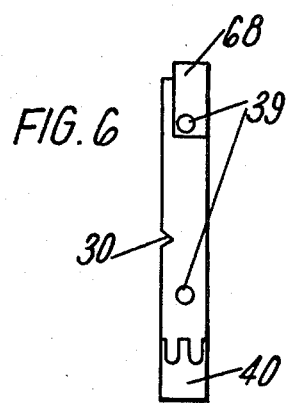
FIG. 6 shows a plan view of a receptacle base.

FIGS. 5 and 6 show elevation and plan views of a receptacle base.

FIG. 5 shows the stud 35 enabling wedge 36 (FIG. 9) to bring the recptacles out onto the evacuation area 37. In order to allow the stud of the receptacle to be engaged by wedge 36, an idling wheel, placed immediately after the last dispenser, pushes the receptacle a few centimeters, freeing notch 30 from the locating ball 29.

Two pins 39 centre the contact springs in the receptacle guide. One of these pins uses the central hole provided in the contact springs and plates for fixing the stack onto the relay.

The edge 40 of the receptable is milled inside over its entire height and thus presents two slots for positioning the contact springs tags.

FIG. 7 shows a side view of a typical dispenser and a receptacle in the position for hooking an insulating plate by one of the receptacle pins.

In this view, one of the sides of the receptable support has not been shown in order to be able to see the position of the two pins of the receptacle under the dispenser, and similarly the support table is drawn in section to show the receptacle guide-rails.

Parts 41 stacked in feed slide 42 under a weight 48 are pushed one at a time when a receptacle passes under the dispenser by pushers 43 and 44 (FIG. 8), fixed to the fitting 45 linked to a slide, which is moved at this instant in the same direction as the endless chain driving the receptacles. A part 41 pushed by tongues 43 and 44 hidden in this view by the pinch-springs 46 and 47, slides along the inclined plane 49 whilst being guided by springs 46 and 37 so as to be hooked by pin 39 of the receptacle. When the latter passes the inclined plane 49, the part drops to the bottom of the receptacle, guided by pin 39 and the edges of the support.

Whilst the receptacle is moving one dispenser to the next slide 65 (and also 66) move backwards, pulling back the pusher tongues 43 and 44 to the rear in view of pushing the next part.

FIG. 8 shows a section through X-Y of a receptacle in the same position of hooking an insulating plate as that shown in FIG. 7.

The plate is seen to be hooked by its central hole on pin 39 of the receptacle; the pushers 43 and 44 are in the fully forward position on the right to expell the part from feed slide 42 and to place it between springs 46 and 47 and the inclined plane 49. When pin 39 of the receptacle has hooked part 41 away frm the inclined plane 49 as it moves towards the right, the part drops to the bottom of the receptacle guided by the pin.

FIG. 9 is a plan view of table 50, supporting the endless chain, which drives the receptacle assemblies represented in FIGS. 3 to 6 and shown as items 51, uniformly spaced along the endless chain at intervals equal to the distances between dispensers 53. Items 53-1, 53-2 to $53n+m$ represent the various dispensers placed along the straight stretches of the endless chain. Wheel 38 and wedge 36, which directs the receptacle bases to the evacuation area 37, are placed immediately after the last dispenser $53n+m$. On this evacuation area are located: the pneumatic device 54 which dispenses two screws for assembling the parts making up a stack, a magnetic moving belt 55 onto which the assembled stacks are pushed by a piston 56 operated by a pneumatic ram 57 at the exit of slide 74, and the stacks 58 which have received their two fixing screws and proceed on the moving belt 55 to the following work stations.

The eccentric mechanisms 59 and 60 impart an oscillating motion to linkages 63 and 64 about axes 61 and 62, causing slides 65 and 66 to move to and fro. These slides carry a fork piece 43 and 44, opposite each dispenser, to push the part to the outlet of the dispenser and place it over the receptacle. During the continuous motion of the receptacle driven by the endless chain, this part is hooked by at least one of the two pins of the receptacle, leaves the slide springs and drops to the bottom of the receptacle, guided by at least one of these pins and the sides of the receptacle, as stated in the description of FIGS. 7 and 8.

Contact 67 monitors at the start of the cycle that supports 52 are equipped with a receptacle. The receptacle, as seen in FIG. 6 is longer than its support (FIG. 4), so that its end 68 protrudes and pushes back lever 69, which maintains the power applied to the endless chain drive motor by holding contact 67 closed.

FIG. 10 is a plan view of the evacuation area.

After passing beneath the last dispenser, the receptacle is unlocked by the idling wheel 38 from its locked position in its support guide during its circuit on the chain. Pulled out by wedge 36, it meets plate 70. Controlled by a cam (not shown) fixed to a sprocket-wheel driven by the endless chain and completing one revolution each time the receptacles pass beneath the dispensers, stud 71 is moved and the receptacle passes between plates 70 and 72, pushing the preceding receptacle between plates 73 and 74. Actuator 62 is powered by the action of another cam (not shown) driven by the same sprocket-wheel. It drives the slide, of which 73 and 74 are the sides, and which contains the receptacle, under the screw dispensing device 75. Two screws are driven by compressed air from a magazine (not shown) of a type known in industry and placed by flexible hoses 76 and 77 under the piston of device 75. When the receptacle is positioned under 75, a contact (not shown) energizes its actuator; in descending, its piston introduces the two screws into the holes they are to occupy in the contact stack and then returns to the raised position. The piston of 62, still controlled by the same cam, places slide 73 and 74 in line with 70 and 72.

The following receptacle, driven by stud 71, pushes a new receptacle between 70 and 72, whilst that which has just received its two screws is moved onto the moving magnetic belt.

Contact 78 ensures that receptacles are transferred safely from the chain to the evacuation area. If for any reason a receptacle comes into contact with plate 70 without being driven by stud 72, plate 70, rotating about its hinge 79, would be pushed by the receptacle moving with the endless chain. The tongue 80 on 70 would then operate contact 78, which stops the endless chain.

Similarly, a contact 81 (visible in FIG. 9) with a feeler 83 checks that as the receptacle leaves dispenser 53-$n$ the contact springs are properly packed in the receptacle. If a part protrudes, feeler 83 is displaced and contact 81 stops the chain and lights a warning lamp.

Although the principles of the present invention are described in relation to a particular practical example, it is clearly understood that the description is given as an example and does not limit the scope of the invention.

We claim:

1. A machine for assembling relay contact stacks, comprising an endless receptacle transport chain, which moves the said receptacles under dispensers, each of said dispensers containing one type of the parts constituting the said contact stack, characterized by the fact that each of the said parts has at least one round hole; the receptacles have two parallel, vertical sides, spaced by a width substantially equal to that of the stack pins corresponding to the number of holes in the various parts, and means for aligning parts so that the edges thereof are parallel over their whole length; dispensers comprising part magazines, pushers, and two sets of flat pinch-springs sloping downwardly; means for controlling said pushers responsive to the movement of the chain as a receptacle passes beneath a dispenser for pushing the first part in the magazine outlet between the two sets of springs; the speed of the pushers being substantially equal to the rate of advance of the claim, the inclination given to the part by the pinch-springs enabling the pins of the reeceptacle to hook the said part by its holes and make it drop to the bottom of the receptacle.

2. The machine of claim 1 wherein the top set of springs is longer than the lower set and continues to bear on the part after it has been hooked by the said pins so as to make it fall rapidly to the bottom of the receptacle.

3. The machine of claim 1 wherein the receptacles comprise a movable part, consisting of a base fixed to the pins and having a notch, and a fixed part forming a support carrying a retractable ball engaged in the notch when in the loading position.

4. The machine of claim 1 including an idling wheel and an oblique slide for removing said bases from said supports on the endless chain after they have been through a complete loading cycle.

5. An automatic machine for producing relay contact stacks comprising receptacle means for receiving and aligning contacts in a relay contact stack transport means for moving said receptacle means under a plurality of dispensing means, each of said dispensing means containing one of the constituent parts of said relay contact stack, each of said parts having at least one round hole on the surface thereof, said receptacle means having two parallel, vertical sides, said sides being spaced by a width equivalent to the width of said relay contact stack said receptacle means including pin means corresponding to the holes in said parts, means for aligning those of said parts which are non-parallel over their length, and means for depositing said parts from said dispensing means into said receptacle means.

6. The machine of claim 5 wherein said dispensing means includes means for storage of said parts, means for pushing said parts in said storage means to the outlet of said storage means responsive to the movement of said transport means as said receptacle means moves under aid dispensing means, and for pushing said parts to the outlet of said storage means at a rate equivalent to the rate of said transport means.

7. The machine of claim 6 and means for enabling said pins of said receptacle means to hook said holes of said parts whereby said parts are deposited into said receptacle means.

References Cited

UNITED STATES PATENTS 2,706,331   4/1955   Bartelheim _____ 29—203
2,865,089  12/1958   Machian _____ 29—203

JAMES M. MEISTER, Primary Examiner

U.S. Cl. X.R.

29—208